May 17, 1960     H. W. RUNDQUIST     2,936,746
WATER HEATED INTAKE MANIFOLD
Filed Sept. 10, 1954     8 Sheets-Sheet 1

Inventor
Henning W. Rundquist
By L. D. Burch
Attorney

May 17, 1960 H. W. RUNDQUIST 2,936,746
WATER HEATED INTAKE MANIFOLD
Filed Sept. 10, 1954 8 Sheets-Sheet 2
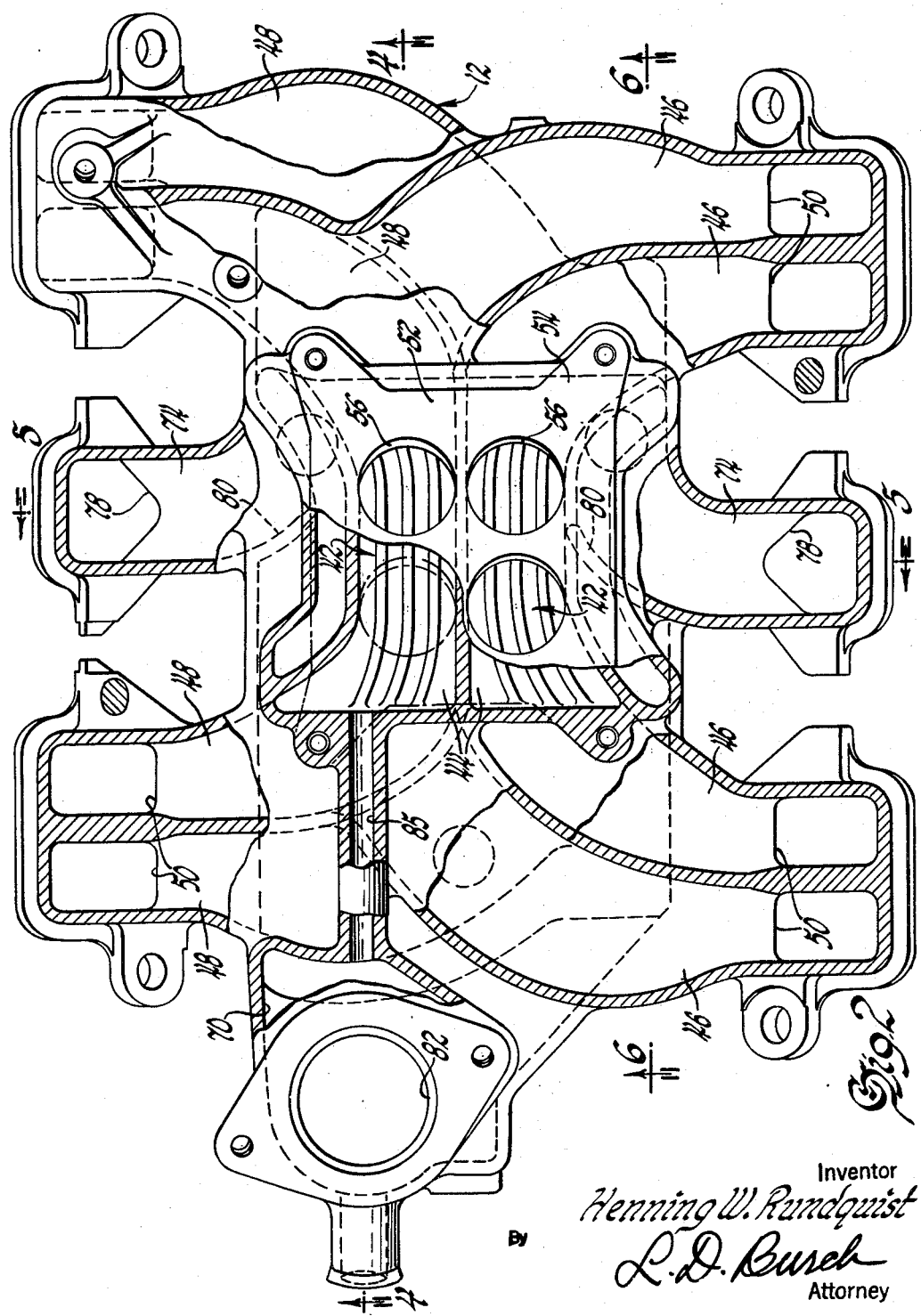
Inventor
Henning W. Rundquist
By L. D. Burch
Attorney

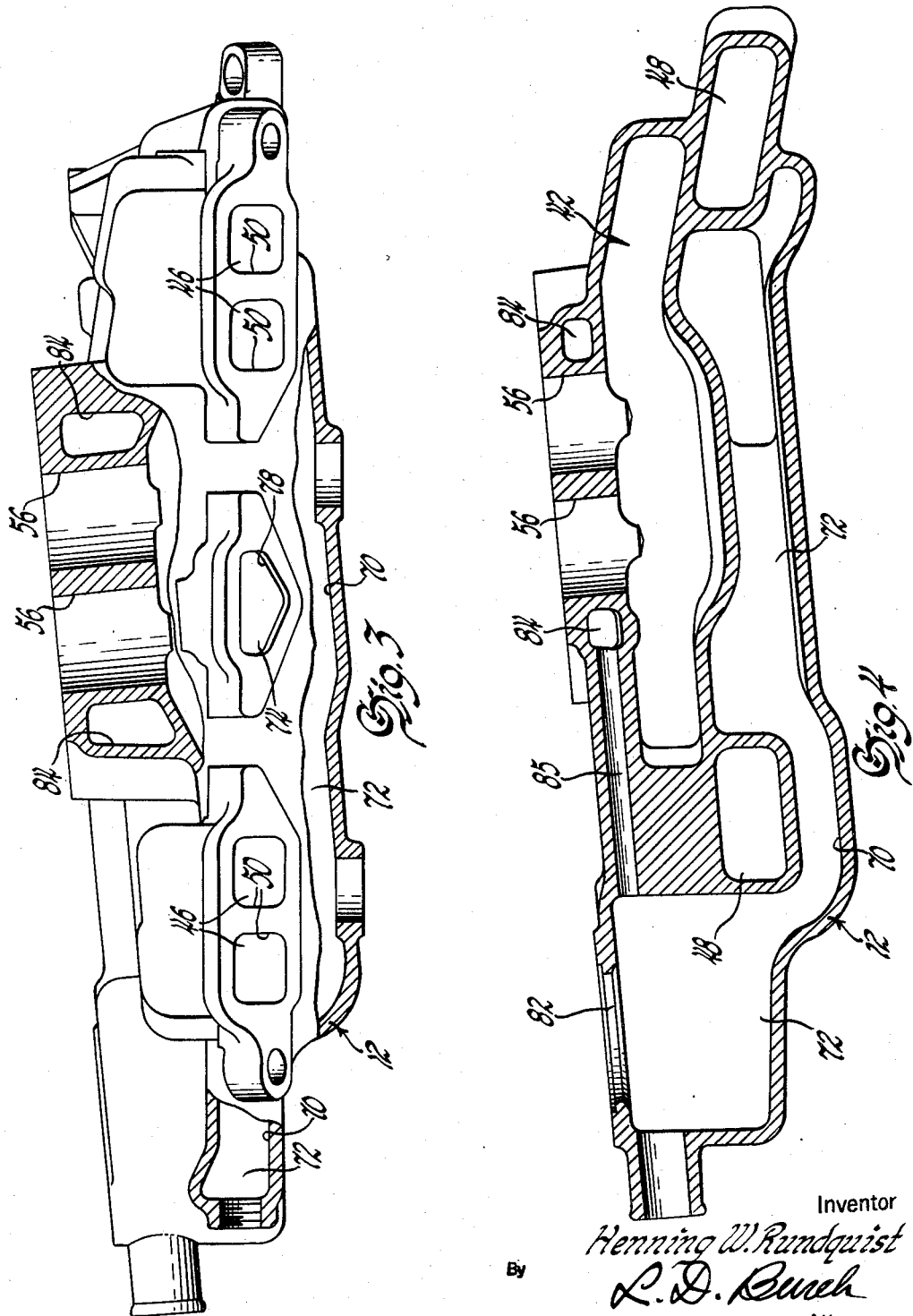

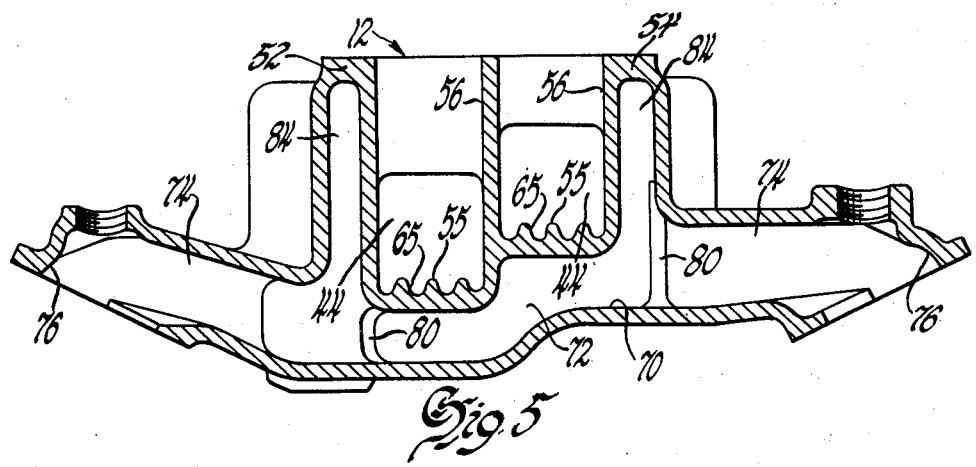
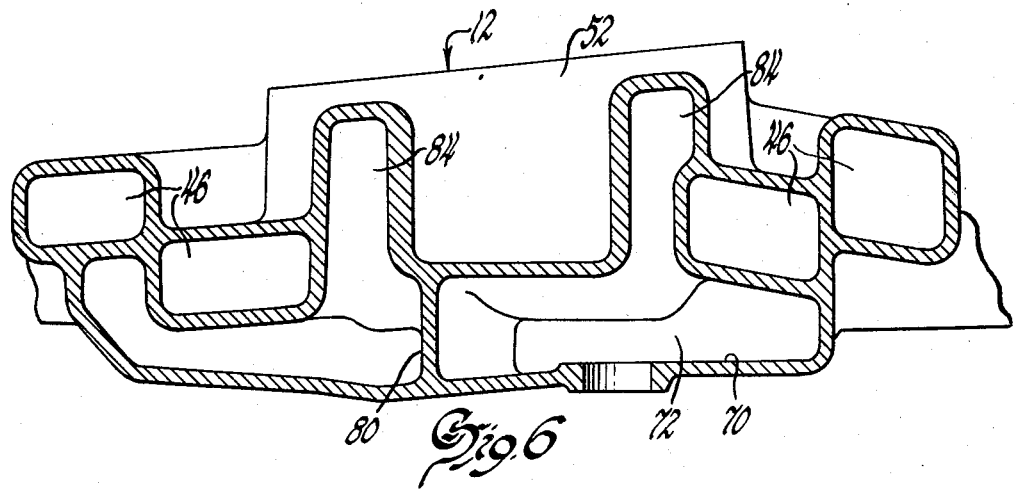

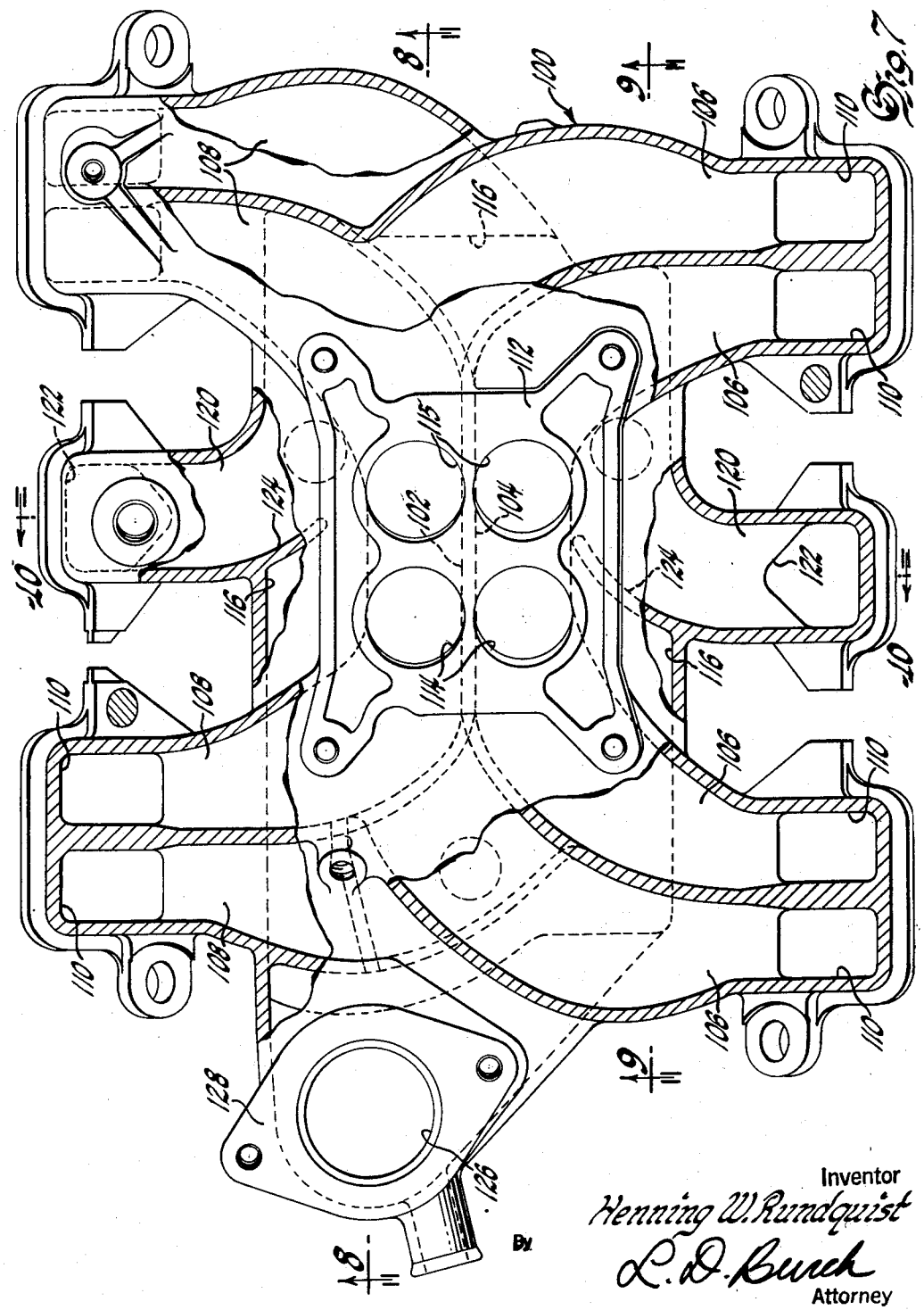

May 17, 1960 H. W. RUNDQUIST 2,936,746
WATER HEATED INTAKE MANIFOLD
Filed Sept. 10, 1954 8 Sheets-Sheet 6
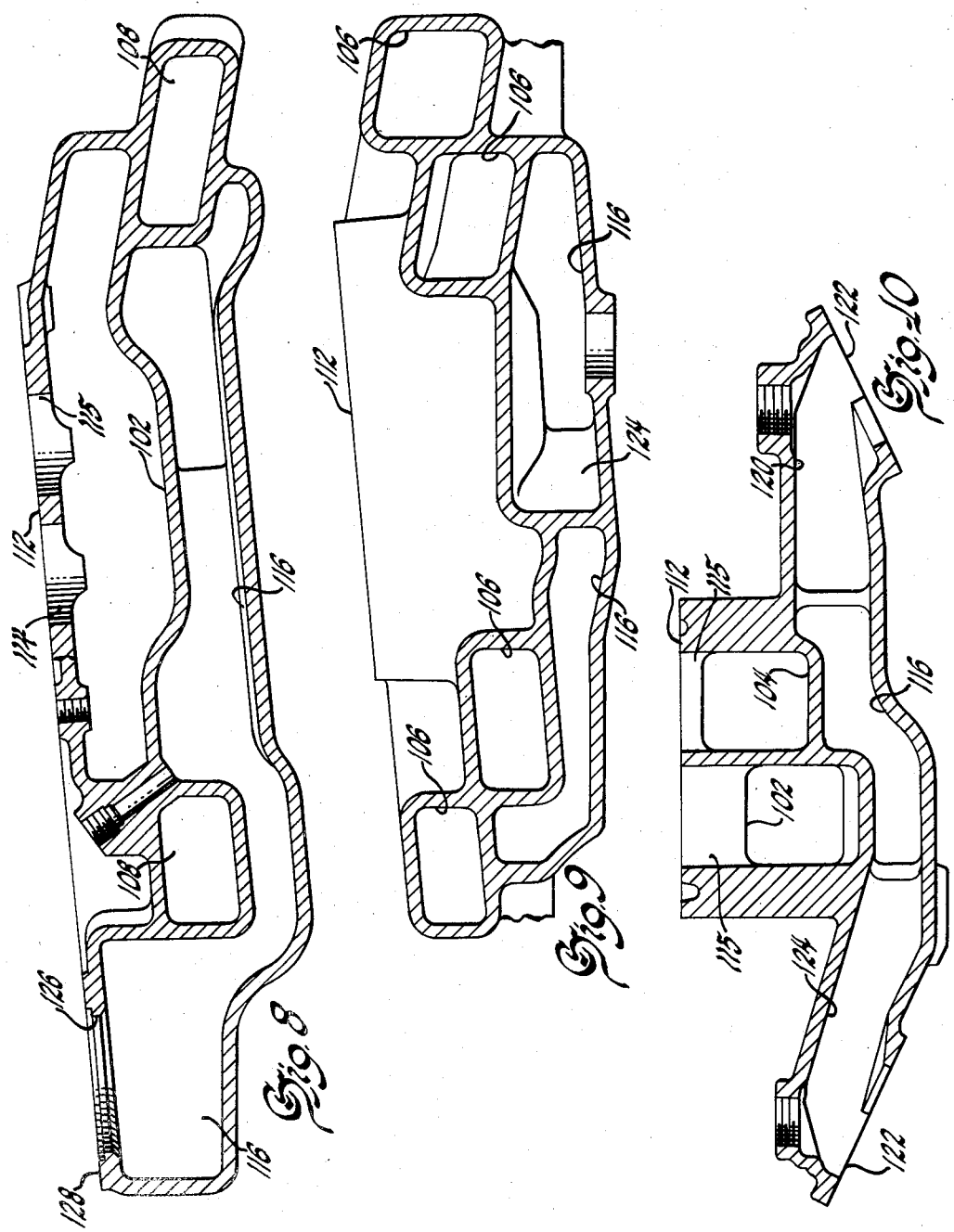
INVENTOR
Henning W. Rundquist
BY
L. D. Burch
ATTORNEY May 17, 1960 H. W. RUNDQUIST 2,936,746
WATER HEATED INTAKE MANIFOLD
Filed Sept. 10, 1954 8 Sheets-Sheet 7
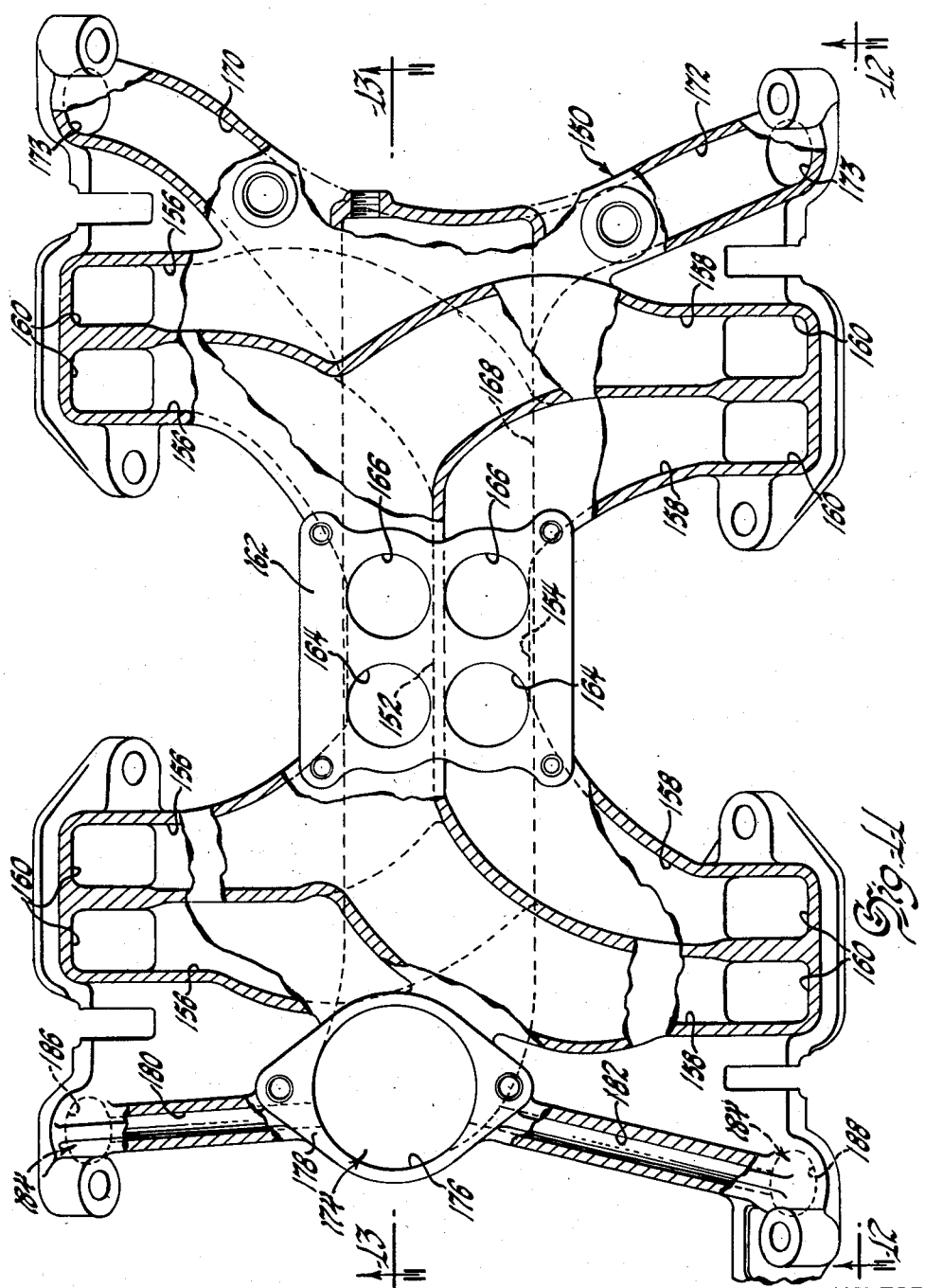
INVENTOR
Henning W. Rundquist
BY
L. D. Burch
ATTORNEY

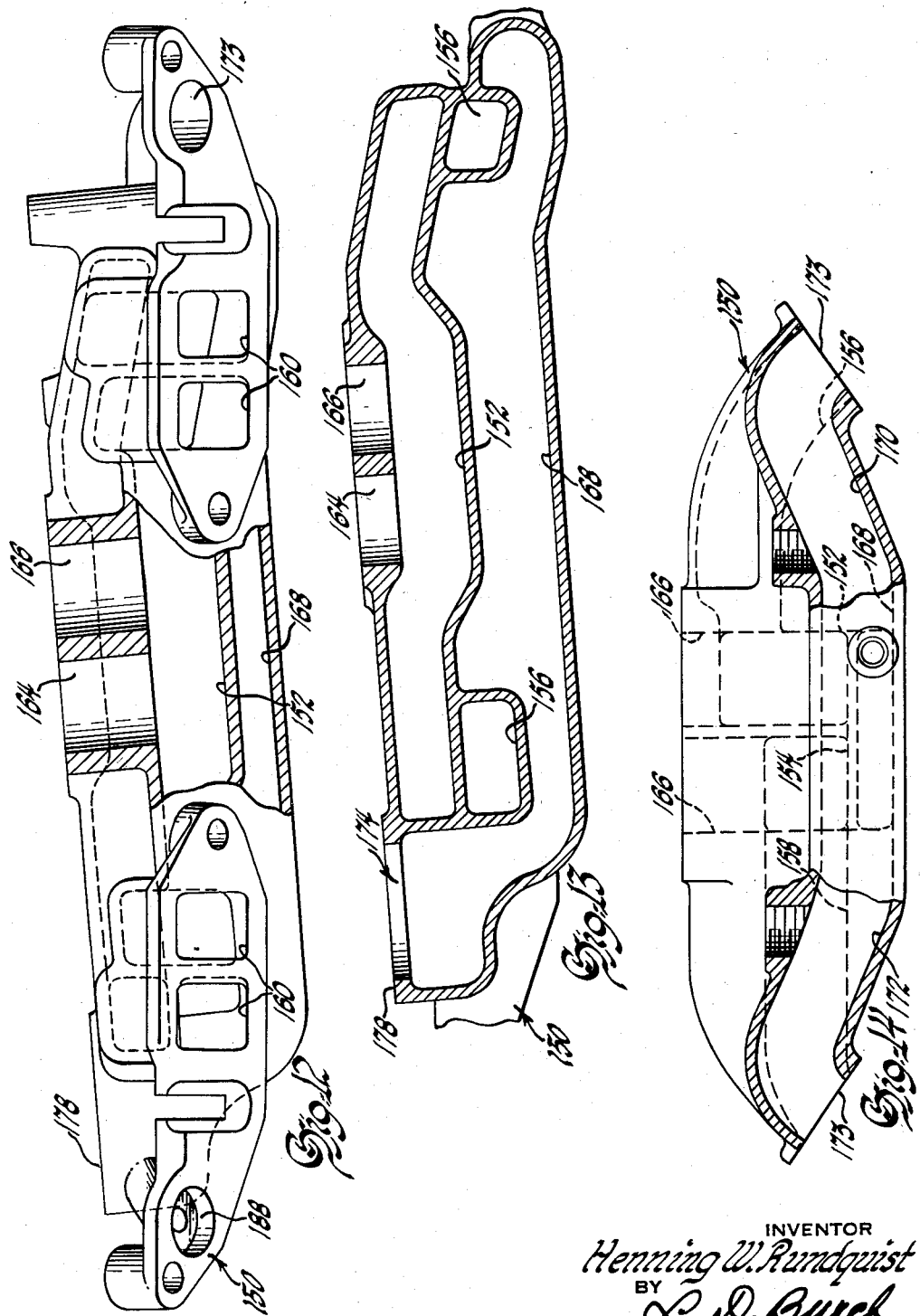

United States Patent Office 2,936,746
Patented May 17, 1960

2,936,746
WATER HEATED INTAKE MANIFOLD

Henning W. Rundquist, East Lansing, Mich., assignor to General Motors Corporation, Detroit, Mich., a corporation of Delaware Application September 10, 1954, Serial No. 455,278

12 Claims. (Cl. 123—122)

The present invention relates to internal combustion engines and more particularly to the induction systems and means for pre-heating the charge therein.

When an engine is operating at subnormal temperatures, there is a tendency for the fuel particles which have been atomized into the charge to precipitate out of the charge and condense on the walls of the distribution passages in the intake manifold. This may be compensated for by employing an excessively rich fuel mixture and heating the distribution passages in the intake manifold so that any fuel particles which do condense thereon will be immediately re-evaporated. Although there have been numerous means for heating the intake manifold, the only system which has attained commercial acceptance is the use of the hot gases in the engine exhaust system. There are numerous objections to this form of heating. The control valve for controlling the flow of the gases in the exhaust system is subjected to hot and highly corrosive gases which tend to interfere with the operation thereof. In addition, as a practical matter, it is very difficult to completely stop the flow of gases through the intake manifold when the engine is hot. It has therefore been suggested that the coolant in the engine cooling system be employed for heating the intake manifold and the charge flowing therethrough. This form of heating has numerous advantages, but heretofore, among other things, it has increased the amount of coolant in the cooling system so as to increase the length of the engine warm up period and the diverting of the coolant through the manifold has interfered with the circulation of the coolant through the engine.

It is now proposed to provide an intake manifold having a water jacket therein which is in heat exchanging relation with the distribution passages in the manifold. This jacket may be in the form of a chamber that extends through the manifold in heat exchanging relation with the distribution passages in the manifold so as to form an integral part of the cooling system.

When the engine is below the normal operating temperatures, it is desirable to increase fuel-air ratio by means of a choke valve. Heretofore, it has been the practice to employ thermostatic means disposed in heat exchanging relation with the exhaust gases for automatically controlling the choke valve in response to the engine temperature. Since the temperatures in the exhaust system vary as a result of numerous factors, they are not a good index of the engine temperatures. This is especially true where the engine is started after having been idle for a short time after having become hot from running.

It is now proposed to provide thermal responsive choke means which are more responsive to engine temperatures. This is to be accomplished by providing a thermostat which is disposed in heat exchanging relation with the engine coolant and is connected to the choke valve. Since the coolant is the primary factor determining the temperature of the engine, this will provide a choking action that is more closely related to the engine temperature.

In the eight sheets of drawings:

Fig. 2 is a plan view of the intake manifold employed in the engine of Fig. 1 with portions thereof being broken away.

Fig. 3 is a side view of the manifold of Fig. 2 with portions thereof being broken away.

Fig. 4 is a longitudinal cross sectional view taken substantially along the plane of line 4—4 in Fig. 2.

Fig. 5 is a transverse cross sectional view taken substantially along the plane of line 5—5 in Fig. 2.

Fig. 6 is a longitudinal cross sectional view similar to Fig. 4, but taken substantially along the plane of line 6—6 in Fig. 2.

Fig. 7 is a plan view of an intake manifold embodying a modified form of the present invention, portions thereof being broken away.

Fig. 8 is a longitudinal cross sectional view taken substantially along the plane of line 8—8 in Fig. 7.

Fig. 9 is a longitudinal cross sectional view taken substantially along the plane of line 9—9 of Fig. 7.

Fig. 10 is a transverse cross sectional view taken substantially along the plane of line 10—10 in Fig. 7.

Fig. 11 is a plan view of an intake manifold embodying the further modification of the present invention, portions thereof being broken away.

Fig. 12 is a side view taken substantially along the plane of line 12—12 in Fig. 11.

Fig. 13 is a longitudinal cross sectional view taken substantially along the plane of line 13—13 in Fig. 11.

Fig. 14 is an end view of the manifold of Fig. 11 with parts broken away and in section.

Figure 1:
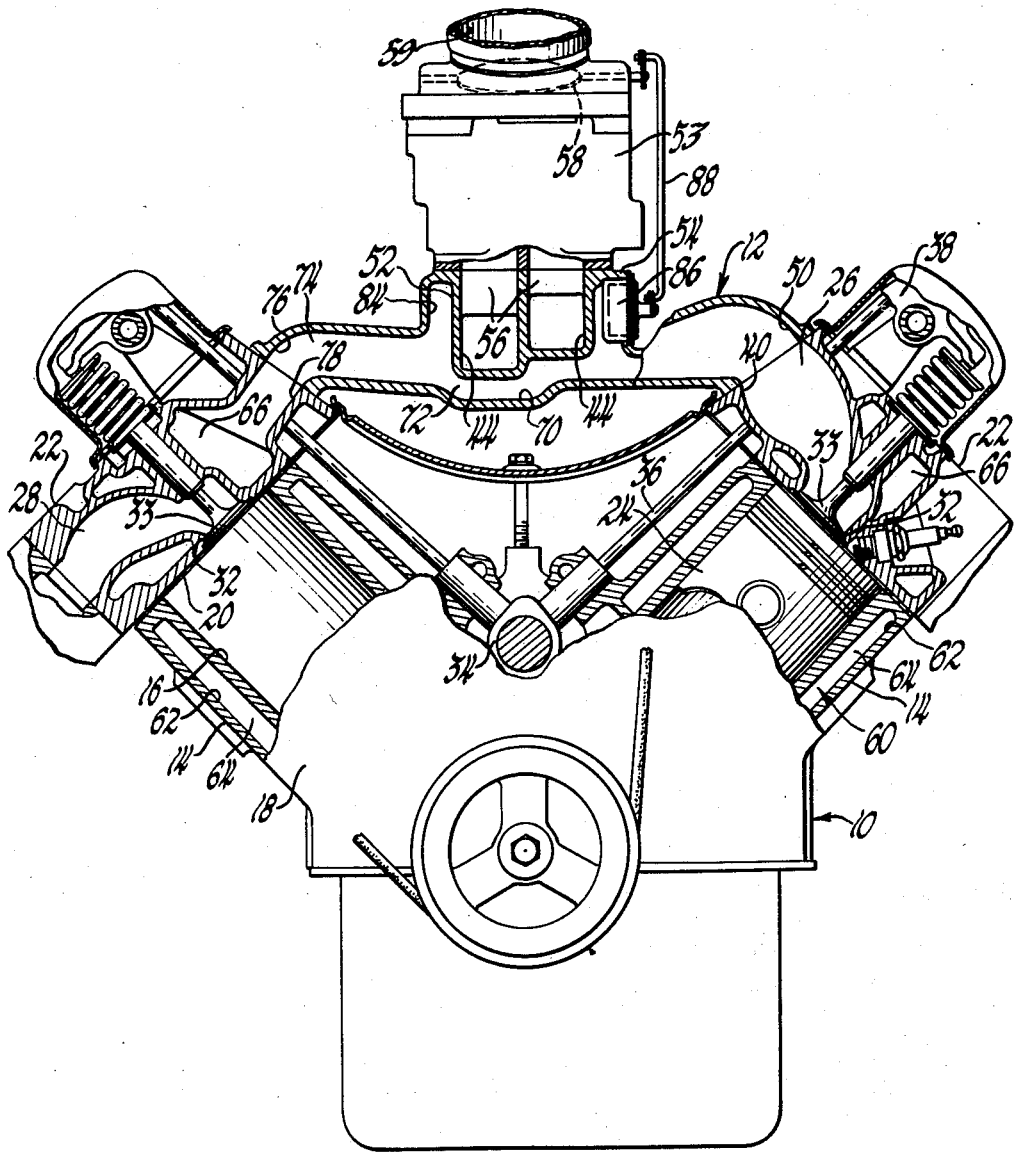
Fig. 1 is an end view of an engine embodying the present invention with portions thereof being broken away to more clearly show the details thereof.

Referring to the drawings in more detail, this invention may be adapted for installation on any suitable engine 10. In the present instance it is incorporated in an intake manifold 12 for an engine 10 of the so-called V-type having angularly disposed cylinder banks 14. Each bank 14 of cylinders may include a plurality of aligned cylinders 16 which extend through the cylinder block 18 to form openings in the faces 20. A cylinder head 22 may seat on each face 20 so as to register with the openings and close them. Pistons 24 having depressions in the head ends thereof may be reciprocably disposed in the cylinders 16 with the head ends thereof cooperating with the heads 22 to form combustion chambers of any suitable shape. Intake passages 26 and exhaust passages 28 may extend through the heads 22 so that each of the combustion chambers has one of each kind of passage communicating therewith. The ends of the passages 26 and 28 communicating with the combustion chambers may form valve seats 32 adapted to have valves 33 disposed therein. A camshaft 34, push rod 36 and rocker arm assembly 38 may be provided for opening and closing the valves 33 for controlling the flow of gases into and out of the combustion chambers. The outer ends of each of the intake passages 26 may form inlet ports 40 on the inner sides of the heads 22.

The intake manifold 12 may be of the "double H" type wherein two separate sets of passages 42 extend through the manifold 12 to carry the charge to the engine combustion chambers. Each set of passages 42 may include a center or distribution portion 44 that extends longitudinally of the manifold 12 and a pair of branch passages 46 and 48 at each end of the distribution passage 44. The branch passages 46 and 48 may be disposed normal to the distribution portion 44 so as to extend transversely of the manifold 12 to form outlets 50 along the sides of the manifold 12 positioned to register with the intake ports 40 in the cylinder heads 22. A carburetor riser 52 may be formed in the center of the manifold 12 with the top thereof forming a flange 54 adapted to receive a carburetor. Although any type of carburetor 55 may be employed, in the present instance, it includes two primary supply passages and two secondary supply passages which discharge through similar supply passages 56 in the riser 52. The passages 56 in the riser 52 may be disposed so that each distribution passage 44 has one primary and one secondary passage connected thereto. A butterfly valve 58 may be provided in the intake 59 of the carburetor 53 to form a choke for controlling the air-fuel mixture ratio. It will thus be seen that the air may be drawn in through the carburetor 53 where it is mixed with the atomized fuel particles and delivered to the combustion chamber via the supply passages 56, the distribution passages 44, the branch passages 46 and 48 and the intake passages 26 in the heads 22.

In order to maintain the engine 10 at a satisfactory operating temperature, a cooling system 60 may be provided in the cylinder block 18 and cylinder head 22. In the present instance this system includes a water jacket 62 having a plurality of water passages 64 that extend through the block 18 in heat exchanging relation with the cylinder walls 16 and a plurality of water passages 66 that extend through the heads 22 in heat exchanging relation with the walls of the combustion chamber and the exhaust valve seats. All of these water passages 64 and 66 are preferably interconnected with each other so that the water may flow freely throughout the interior of the entire engine 10. Any suitable heat exchanger such as a radiator may be provided for cooling the water after it has passed through the engine and absorbed the heat therein.

When the engine 10 is cold, there is a tendency for the atomized fuel particles in the charge to condense and/or precipitate out of the charge. It is therefore apparent that under these conditions it may be desirable to heat the walls of the distribution passages 44 and raise the temperature of the charge sufficiently to reduce the tendency for the fuel to precipitate.

The means for heating the charge may include a water jacket 70 in the intake manifold 12. In the present instance, this jacket 70 comprises a chamber 72 that extends longitudinally of the manifold 12 in heat exchanging relation with the sets of passages 42. This chamber 72 may be disposed underneath the distribution passages 44 for heating principally the area around the intersection of the supply passages 56 and the center portions of the distribution passages 44. Thus there will be a hot spot formed in the area where the fuel may be thrown out of the charge when it turns around the corner between the supply passages 56 and the distribution passages 44. Ribs 55 may be provided at the hot spot and on upper surfaces of the lower walls of the passages 44 to increase the heat conductivity of the walls and to provide parallel depressions 65 in which separated fuel may be allowed temporarily to collect.

Water inlet passages 74 may be formed in the opposite sides of the manifold 12. The inner ends of the passages 74 communicate with the opposite sides of the chamber while the outer ends form ports 76 in the sides of the manifold 12 to register with openings 78 in the heads. Thus the water jacket 70 in the manifold 12 will communicate with the water jackets 66 in the heads 22 and the water may flow from the heads to the manifold. Baffles 80 may be provided inside of the chamber 72 adjacent the inner ends of the passages 74 for diverting the hot water flowing through the inlets 78 into the rear of the water jacket 70. An outlet 82 may be provided in the manifold 12 for allowing the water to escape from the water jacket 70. The outlet 82 is preferably disposed at the end away from the baffles 80 so that the water will flow through all portions thereof. In the present instance the outlet 82 includes a flange adapted to receive a coupling for interconnecting the water jacket with the radiator. Thus the hot water may flow from the heads 22 into the radiator via the manifold 12 so as to heat the charge flowing through the distribution passages.

When a fuel such as gasoline is atomized into the air, a considerable amount of evaporation occurs. Under certain atmospheric conditions, this evaporation may lower the temperature of the surrounding structure sufficiently to cause moisture in the air to freeze and deposit on the parts of the carburetor 53. These deposits may become large enough to prevent the operation of the carburetor. Accordingly, a portion of the chamber 72 may extend up around the carburetor riser 52 so as to keep the riser and carburetor heated. In the present instance this portion forms a jacket 84 that extends around the riser 52 in heat exchanging relation with the fuel supply passages 56. A passage 85 may be provided which extends forwardly towards and terminates adjacent the outlet 82. Thus the water in the jacket 70 may flow into the jacket 84 and heat the riser 52.

The choke valve 58 in the carburetor inlet 59 may be automatically actuated in response to engine temperature. It has been found that since the cooling water in the engine 10 determines the temperature of the engine, it is preferable to employ the temperature of the water for actuating the choke 58. Thus a cup 86 may be provided in the manifold 12 for housing the thermal responsive element. In the present instance the cup 86 is disposed in the side of the carburetor riser 52 and the temperature responsive element is retained in heat exchanging relation with the water in the chamber. This element may be interconnected with the choke valve 58 by means of a link 88 so that as the temperature of the water rises, the thermostatic element will tend to open the choke valve 58. When the engine 10 reaches normal operating temperatures, the choke valve 58 will be completely open. It should be noted that this structure which is responsive to the water temperature will actuate the choke valve 58 in closer response to the temperature of the engine, and it will not be subjected to the wide fluctuations occurring as a result of variations in the exhaust temperatures. This is especially important where the engine 10 is inoperative for a short period after it has become hot. The cooling water will not cool off as fast as the exhaust gases, and therefore the choke valve 58 will be retained in an open position as long as the engine is hot.

In the modification shown in Figs. 7 through 10, inclusive, the manifold 100 is generally similar to the preferred embodiment. The modification may be of the "double H" type so as to include separate sets of passages therein. Each set of passages may include a center or distribution passage 102 and 104 which extends longitudinally of the manifold 100 and pairs of branch passages 106 and 108. The pairs of branch passages 106 and 108 may extend transversely of the manifold 100 from the opposite ends of the distribution passages 102 and 104 to form ports 110 on the opposite sides of the manifold 100 for communicating with the intake ports in the engine.

A carburetor riser 112 may be disposed in the center of the manifold 100 for supporting any suitable carburetor. In the present instance the carburetor is of the compound type having two sets of primary and secondary mixture forming passages. Accordingly, the carburetor riser 112 may include a pair of primary fuel supply passages 114 and a pair of secondary fuel supply passages 115 with one fuel supply passage from each pair intersecting the center of one of said distribution passages 102 and 104.

In order to heat the charge in the manifold 100, a chamber 116 may be formed in the manifold 100 to extend longitudinally of the manifold 100 in heat exchanging relation with the portion of the distribution passages 102 and 104 adjacent the intersection of the fuel supply passages 114 and 116 and the distribution passages 102 and 104. Thus the contents of the chamber 115 will form a hot spot on the surface of the distribution passages 102 and 104 where the fuel particles are most likely to precipitate and collect.

A pair of inlet passages 120 may be formed in the sides of the manifold 100 that communicate with the chamber 116. The outer ends of these passages 120 may form apertures 122 in the opposite sides of the manifold 100 between the ports 110 formed by the branch passages 106 and 108. These apertures 122 may be positioned to communicate with the coolant jacket in the engine cylinder heads while the inner ends may communicate with the chamber 116 adjacent the center thereof. A pair of fins or baffles 124 may be provided in the chamber 116 adjacent the inner ends of the passages 120 for diverting the flow of coolant from the inlet passages toward the rear of the chamber 116.

An outlet 126 may be provided in a flange 128 at the forward end of the manifold 100 for allowing the coolant in the chamber 116 to flow out of the chamber to a radiator for cooling the coolant. Thus the hot engine coolant may flow from the cylinder heads through the inlet passages 120 into the chamber 116. The coolant may then circulate around the distribution passages 102 and 104 and heat them and the charge therein. The coolant may then flow through the outlet 126 to the radiator.

In the modification disclosed in Figs. 11 through 14, inclusive, the manifold 150 of the "double H" type having two sets of distribution passages 152 and 154 with branch passages 156 and 158 extending from the opposite ends thereof to form openings 160 that register with the intake ports in the sides of the engine.

A carburetor riser 162 may be formed in the center of the manifold 150 for supporting a carburetor having one or more mixture forming passages therethrough. In the present instance the riser 162 includes a pair of primary fuel supply passages 164 and a pair of secondary fuel supply passages 166. One passage from each pair may communicate with the center portion of one of the distribution passages. In order to heat the walls of these distribution passages 152 and 154, a duct 168 may be formed in the bottom of the manifold 150 so as to extend longitudinally thereof in heat exchanging relation with the walls of the distribution passages 152 and 154. This will form a hot spot on the walls of the distribution passages especially around the intersection of the fuel supply passages 164 and 166 and the distribution passages 152 and 154.

A set of inlet passages 170 and 172 may be provided adjacent one end of the manifold 150 so as to extend transversely thereof for communicating with the cooling jacket in the cylinder head. The inner end of each inlet passages 170 and 172 may open into the duct 168 adjacent one end thereof while the outer ends of these passages 170 and 172 form apertures 173 positioned to register with ports extending into the cylinder head cooling jacket. Thus the heated coolant may flow from the cylinder head into the after end of the duct 168 and then forwardly in heat exchanging relation with the walls of the distribution passages 152 and 154. In order to allow the coolant to leave the duct 168 an outlet 174 may be provided which extends from the forward end of the duct 168 to form an aperture 176 in the flange 178 on the forward end of the manifold 150. This aperture 176 may be connected to the radiator by any suitable connection such as a radiator hose.

A pair of by-pass passages 180 and 182 may be provided that extend transversely of the manifold 150 to form openings 184 on the forward end of the manifold 150 between the forward end and the ports 160. One end 186 and 188 of these passages 180 and 182 may be positioned to register with similar ports on the forward end of the cylinder head to communicate with the forward end of the cooling jacket in the head. The other ends of these passages 180 and 182 may discharge directly into the outlet 174. It is thus apparent that the coolant may flow from the front end of the head jacket to the radiator without passing through the manifold. This not only allows the coolant to bypass the manifold but it also insures an adequate flow of coolant to all portions of the head jacket.

Various changes and modifications of the embodiments of the invention described herein may be made by those skilled in the art without departing from the spirit and principles of the invention.

What is claimed is:

1. An intake manifold adapted to be installed on an engine having a plurality of cylinders and a cooling system having a coolant in heat absorbing relation with said engine, said intake manifold comprising a plurality of distribution passages which extend through said manifold to form openings on a side thereof, said openings being positioned to register with the intake ports of said engine for supplying a combustible charge to the cylinders therein, a carburetor riser on said manifold being adapted to receive a carburetor and also having a fuel supply passage therein communicating with said distribution passages, a chamber extending longitudinally of said manifold in heat exchanging relation with said distribution passages, an outlet in said manifold communicating with one end of said chamber for discharging the coolant back into said coolant system, a cooling passage formed in said manifold with one end thereof forming an inlet opening in the side of said manifold in substantial alignment with the openings formed by said distribution passages, the other end of said cooling passage communicating with said chamber, baffles in said chamber positioned adjacent said coolant passage for diverting the coolant flowing therethrough towards an opposite end of said chamber.

2. The manifold of claim 1 wherein at least a portion of said chamber is disposed in heat exchanging relation with said carburetor riser.

3. An intake manifold adapted to be installed on an engine having a plurality of cylinders and a cooling system having a coolant in heat absorbing relation with said engine, said intake manifold comprising a plurality of distribution passages which extend through said manifold to form openings on a side thereof, said openings being positioned to register with the intake ports of said engine for supplying a combustible charge to the cylinders therein, a carburetor riser on said manifold being adapted to receive a carburetor and also having a fuel supply passage therein communicating with said distribution passages, a chamber extending longitudinally of said manifold in heat exchanging relation with said distribution passages, an outlet in said manifold communicating with one end of said chamber for discharging the coolant back into said coolant system, a cooling passage formed in said manifold communicating with said chamber and having one end thereof forming an inlet opening in the side of said manifold in substantial alignment with the openings formed by said distribution passages, a thermal responsive element disposed in heat exchanging relation with said coolant in said chamber and being effective for actuating a choke valve on said carburetor.

4. An intake manifold for an engine having a pair of angularly disposed banks of cylinders and a cooling system in heat absorbing relation with said cylinders, said intake manifold comprising a pair of distribution passages extending longitudinally of said manifold, pairs of branch passages extending transversely through said manifold from the opposite ends of said distribution passages to form ports on the opposite sides of said manifold, said ports being adapted to communicate with intake ports on said engine, a carburetor riser on said manifold adapted to receive a carburetor and also having a plurality of fuel supply passages extending downwardly therethrough to communicate with said distribution passages, a jacket extending longitudinally of said manifold in opposite directions with respect to said carburetor riser and having an inlet and an outlet communicating with said cooling system, said jacket having a part thereof in heat exchanging relation with said distribution passages and a part thereof in heat exchanging relation with at least a portion of said carburetor riser.

5. An intake manifold adapted to be installed on an engine having a plurality of cylinders and a cooling system having a coolant in heat absorbing relation with said cylinders, said intake manifold comprising charge distribution passages which extend through said manifold to form openings positioned to register with the intake ports of said engine for supplying a combustible charge to the cylinders therein, a carburetor riser on said manifold adapted to receive a carburetor and also having a substantially vertical fuel supply passage extending downwardly from said carburetor through said riser to intersect said distribution passages adjacent the top thereof, a chamber formed in said manifold below and throughout the length of said distribution passages and in heat exchanging relation with said distribution passages, a coolant passage formed in said manifold with one end thereof communicating with said chamber and the other end thereof forming an inlet opening in a side of said manifold for communicating with the coolant in said cooling system in said engine and an outlet in said manifold for interconnecting said chamber with said cooling system for discharging said coolant back into said cooling system.

6. An intake manifold adapted to be installed on an engine having a plurality of cylinders and a cooling system having a coolant in heat absorbing relation with said cylinders, said intake manifold comprising charge distributing passages which have floors on the bottom thereof and are positioned to extend through said manifold to form openings positioned to register with the intake ports of said engine for supplying a combustible charge to the cylinders therein, a carburetor riser on said manifold adapted to receive a downdraft carburetor and also having a substantially vertical fuel supply passage extending downwardly from said carburetor through said riser to intersect said distribution passage adjacent the top thereof and in substantial alignment with said floor, a chamber formed in said manifold below and throughout the length of said distribution passages and in heat exchanging relation with said distribution passages for heating said floor, a cooling passage formed in said manifold with one end thereof communicating with said chamber, and the other end forming an inlet opening in a side of said manifold for communicating with the coolant in said cooling system in said engine and an outlet in said manifold for interconnecting said chamber with said cooling system for discharging said coolant back into said cooling system.

7. The intake manifold of claim 4 including a bypass interconnecting said second part with said first part adjacent said outlet.

8. An intake manifold adapted to be installed on an engine having a pair of angularly disposed banks of cylinders and a cooling system having a coolant in heat absorbing relation with said engine, said intake manifold comprising a plurality of distribution passages having center portions extending longitudinally of said manifold with the opposite ends thereof forming openings in the sides of said manifold, said openings being positioned to register with the intake ports on said engine for supplying a combustible charge to the cylinders therein, a carburetor riser on said manifold adapted to receive a carburetor and also having fuel supply passages therein communicating with the center portion of said distribution passages, a duct extending longitudinally of said manifold in heat exchanging relation with at least the center portion of said distribution passages adjacent the intersection of said fuel supply passages and said distribution passages, an outlet communicating with one end of said duct and forming an aperture adjacent said end of said manifold, at least one inlet passage formed in said manifold adjacent the opposite end thereof, one end of said inlet passage communicating with said opposite end of said duct, the other end of said inlet passage being adapted to communicate with the coolant in said cooling system, by-pass passages in said first end of said manifold terminating adjacent said outlet for carrying said coolant from said cooling system directly to said outlet.

9. An intake manifold for an engine having a pair of angularly disposed banks of cylinders and a cooling system in heat absorbing relation with said cylinders, said intake manifold comprising a pair of distribution passages extending longitudinally of said manifold, pairs of branch passages extending transversely through said manifold from the opposite ends of said distribution passages to form ports on the opposite sides of said manifold, said ports being adapted to communicate with intake ports on said engine, a carburetor riser on said manifold adapted to receive a carburetor and also having a plurality of fuel supply passages extending therethrough to communicate with said distribution passages, a chamber extending longitudinally of said manifold below and throughout the length of said distribution passages and in heat exchanging relation with the portions of said distribution passages adjacent the intersections of said distribution passages and said fuel supply passages, at least one intake passage extending transversely through said manifold with one end thereof communicating with said chamber and the other end forming intake openings in the sides of said manifold for communicating with said cooling system.

10. The intake manifold of claim 9 wherein said intake openings are disposed in the sides of said manifold between said ports and including an outlet adjacent one end of said manifold, said outlet communicating with both said cooling system and said chamber adjacent said end, and baffles in said chamber adjacent said first end of said intake passage for diverting said coolant towards an opposite end of said chamber.

11. An intake manifold for an engine having a pair of angularly disposed banks of cylinders and a cooling system in heat absorbing relation with said cylinders, said intake manifold comprising a pair of distribution passages extending longitudinally of said manifold, pairs of branch passages extending transversely through said manifold from the opposite ends of said distribution passages to form ports on the opposite sides of said manifold, said ports being adapted to communicate with intake ports on said engine, a carburetor riser on said manifold adapted to receive a carburetor and also having a plurality of fuel supply passages extending therethrough to communicate with said distribution passages, a duct positioned longitudinally of said manifold and extending from one end thereof to the other end in heat exchanging relation with at least the portion of said distribution passages adjacent the intersection of said distribution passages and said fuel supply passages, a pair of intake passages communicating with one end of said duct and forming inlet openings on the opposite sides of said manifold between the end thereof and said ports formed by said distribution passages, said inlet openings being adapted to communicate with said cooling system for carrying coolant into said end of said duct, an outlet adjacent the opposite end of said manifold communicating with said opposite end of said duct and by-pass passages extending transversely through said manifold to form openings on the sides of said manifold between said opposite ends and said ports formed by said distribution passages, said by-pass passages communicating directly with said outlet.

12. The intake manifold of claim 9 including a housing in said manifold in heat exchanging relation with the contents of said chamber, said housing being adapted to receive a thermal responsive element for actuating a choke on said carburetor.

References Cited in the file of this patent

UNITED STATES PATENTS

| | | |
|---|---|---|
| 1,335,990 | Short | Apr. 6, 1920 |
| 1,355,068 | Vincent | Oct. 5, 1920 |
| 2,686,506 | Carpentier et al. | Aug. 17, 1954 |
| 2,716,399 | Rothwell | Aug. 30, 1955 |